(12) United States Patent  
Damola et al.

(10) Patent No.: US 9,118,741 B2  
(45) Date of Patent: Aug. 25, 2015

(54) STREAMING TRANSFER SERVER, METHOD, COMPUTER PROGRAM AND COMPUTER PROGRAM PRODUCT FOR TRANSFERRING RECEIVING OF MEDIA CONTENT

(75) Inventors: Ayodele Damola, Solna (SE); Ignacio Más Ivars, Tullinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 239 days.

(21) Appl. No.: 13/993,636

(22) PCT Filed: Dec. 15, 2010

(86) PCT No.: PCT/SE2010/051389
§ 371 (c)(1),
(2), (4) Date: Jun. 12, 2013

(87) PCT Pub. No.: WO2012/082032
PCT Pub. Date: Jun. 21, 2012

(65) Prior Publication Data
US 2013/0268637 A1    Oct. 10, 2013

(51) Int. Cl.
*G06F 15/16* (2006.01)
*H04L 29/06* (2006.01)
*H04L 29/08* (2006.01)

(52) U.S. Cl.
CPC ............ *H04L 65/60* (2013.01); *H04L 65/1083* (2013.01); *H04L 65/4092* (2013.01); *H04L 67/14* (2013.01); *H04L 67/148* (2013.01); *H04L 67/2809* (2013.01); *H04L 67/2871* (2013.01)

(58) Field of Classification Search
CPC . H04L 65/60; H04L 65/1083; H04L 65/4092; H04L 67/14; H04L 67/2809; H04L 67/148; H04L 67/2871

USPC ......... 709/203, 204, 216–219, 231; 370/235, 370/338
See application file for complete search history.

(56) References Cited

U.S. PATENT DOCUMENTS

| 7,219,127 | B2* | 5/2007 | Huck et al. .................... 709/204 |
| 7,644,414 | B2* | 1/2010 | Smith et al. ................... 719/328 |

(Continued)

FOREIGN PATENT DOCUMENTS

| WO | WO 03/096669 A2 | 11/2003 |
| WO | WO 2008/052763 A2 | 5/2008 |

OTHER PUBLICATIONS

International Search Report, PCT/SE2010/051389, Sep. 15, 2011.
(Continued)

*Primary Examiner* — Thu Ha Nguyen
(74) *Attorney, Agent, or Firm* — Myers Bigel Sibley & Sajovec, P.A.

(57) ABSTRACT

It is presented a method for transferring receiving of streaming content from a first media receiver to a second media receiver, the method comprising the steps, executed in a streaming transfer server, of: receiving a presence message indicating the presence of the second media receiver; receiving an in use message indicating that the first media receiver is in active use by the user; transmitting a present media receiver message to the first media receiver, the present media receiver message comprising an identifier of the second media receiver; receiving a transfer message indicating that the receiving of the streaming content should be transferred from the first media receiver to the second media receiver; obtaining an identifier of the streaming content; and transmitting an initiate content message to the second media receiver, wherein the initiate content message comprises the identifier of the streaming content.

25 Claims, 4 Drawing Sheets

(56) References Cited

U.S. PATENT DOCUMENTS

| | | | |
|---|---|---|---|
| 7,764,971 B2* | 7/2010 | Chu et al. | 455/518 |
| 8,583,821 B1* | 11/2013 | Yuan | 709/235 |
| 2002/0068558 A1* | 6/2002 | Janik | 455/422 |
| 2003/0174648 A1* | 9/2003 | Wang et al. | 370/235 |
| 2003/0212803 A1* | 11/2003 | Wu et al. | 709/228 |
| 2004/0008635 A1* | 1/2004 | Nelson et al. | 370/260 |
| 2004/0128342 A1* | 7/2004 | Maes et al. | 709/200 |
| 2004/0215718 A1* | 10/2004 | Kazmi et al. | 709/203 |
| 2005/0278453 A1* | 12/2005 | Cherkasova | 709/231 |
| 2007/0100998 A1* | 5/2007 | Ramadan et al. | 709/225 |
| 2007/0107016 A1* | 5/2007 | Angel et al. | 725/61 |
| 2007/0169142 A1* | 7/2007 | Claassen et al. | 725/10 |
| 2007/0171903 A1* | 7/2007 | Zeng et al. | 370/389 |
| 2008/0010382 A1* | 1/2008 | Ratakonda et al. | 709/231 |
| 2010/0053302 A1* | 3/2010 | Ivashin et al. | 348/14.08 |
| 2012/0113964 A1* | 5/2012 | Petersen et al. | 370/338 |
| 2012/0316962 A1* | 12/2012 | Rathod | 705/14.54 |
| 2013/0064110 A1* | 3/2013 | Polinati et al. | 370/252 |
| 2014/0219167 A1* | 8/2014 | Santhanam et al. | 370/328 |
| 2014/0379871 A1* | 12/2014 | Van Brandenburg et al. | 709/219 |

OTHER PUBLICATIONS

Written Opinion of the International Searching Authority, PCT/SE2010/051389, Sep. 15, 2011.

International Preliminary Report on Patentability, PCT/SE2010/051389, Feb. 27, 2013.

Shacham et al.: "The virtual device: expanding wireless communication services through service discovery and session mobility", Wireless and Mobile Computing, Networking and Communications, 2005. (WIMOB'2005), IEEE International Conference on Montreal, Canada Aug. 22-24, 2005, Piscataway, NJ, USA, IEEE, vol. 4, Aug. 22, 2005, pp. 73-81, XP010839733, ISBN: 978-0-7803-9181-9.

* cited by examiner

STREAMING TRANSFER SERVER, METHOD, COMPUTER PROGRAM AND COMPUTER PROGRAM PRODUCT FOR TRANSFERRING RECEIVING OF MEDIA CONTENT

CROSS REFERENCE TO RELATED APPLICATION

This application is a 35 U.S.C. §371 national stage application of PCT International Application No. PCT/SE2010/051389, filed on 15 Dec. 2010, the disclosure and content of which is incorporated by reference herein in its entirety. The above-referenced PCT International Application was published in the English language as International Publication No. WO 2012/082032 A1 on 21 Jun. 2012.

TECHNICAL FIELD

The invention relates to receiving streaming content and more particularly to transferring receiving of streaming content from one media receiver to another.

BACKGROUND

Video streaming is a widely used service on the Internet today. YouTube is a prime example of a video streaming web portal used by millions of users daily. Usually short user generated clips are offered but lately full length movies are also available, sometimes bundled with advertisements. Many other streaming services of different variants are also available.

Users these days have more and more devices able to be used to consume streaming services such as YouTube. For example, apart from traditional personal computers, devices such as mobile phones, televisions, tablet computers and even some car entertainment systems can access YouTube today.

However, sometimes a user wishes to transfer the receiving of media content from one device to another. A rudimentary way of doing this task would e.g. be to somehow save the URL of a current content such as in a bookmark, synchronise the bookmark with the target device and navigate to the bookmark on the target device. However, this is a cumbersome and potentially unreliable process.

WO03096669 presents systems and methods for navigating hypermedia using multiple coordinated input/output device sets. Disclosed systems and methods allow a user and/or an author to control what resources are presented on which devices sets (whether they are integrated or not), and provide for coordinating browsing activities to enable such a user interface to be employed across multiple independent systems.

SUMMARY

An object of embodiments herein is to provide a simpler and more robust way to combine an IP network and a cable television network for content delivery.

According to a first embodiment, it is presented a streaming transfer server for transferring receiving of streaming content from a first media receiver to a second media receiver, wherein both the first and second media receivers are associated with the same user. The streaming transfer server comprises: a presence message receiver arranged to receive a presence message indicating the presence of the second media receiver; an in use message receiver arranged to receive an in use message indicating that the first media receiver is in active use by the user; a present media receiver message transmitter arranged to transmit a present media receiver message to the first media receiver, the present media receiver message comprising an identifier of the second media receiver; a transfer message receiver arranged to receive a transfer message indicating that the receiving of the streaming content should be transferred from the first media receiver to the second media receiver, wherein the transfer message comprises an identifier of the streaming content; a content identifier arranged to obtain an identifier of the streaming content; and an initiate content message transmitter arranged to transmit an initiate content message to the second media receiver, wherein the initiate content message comprises the identifier of the streaming content and the current position in the streaming content.

The in use message receiver may further be arranged to receive an in use message indicating that the second media receiver is in active use by the user; and the present media receiver message transmitter may further be arranged to transmit a present media receiver message to the second media receiver, the present media receiver message comprising an identifier of the first media receiver.

The streaming transfer server may further comprise: a current position obtainer arranged to obtain a current position in the streaming content; and the initiate content message may comprise the current position in the streaming content.

The transfer message may comprise the current position in the streaming content and the current position obtainer is arranged to obtain the current position from the transfer message.

The current position obtainer may be arranged to obtain the current position by querying a content server serving the streaming content.

The transfer message may comprise the identifier of the streaming content and the content identifier may be arranged to obtain the identifier of the streaming content from the transfer message.

The content identifier may be arranged to obtain the identifier of the streaming content by querying the first media receiver.

The presence message receiver is arranged to receive a presence message from a device gateway capable of discovering presence of a media receiver connected to the device gateway.

The presence message receiver may further be arranged to receive a presence message indicating the presence of a third media receiver; and the present media receiver message transmitter may further be arranged to transmit a present media receiver message comprising an identifier of the third media receiver.

The presence message receiver may further be arranged to receive a deactivate message indicating that the first media receiver has been deactivated; and the present media receiver message transmitter may further be arranged to transmit a present media receiver message to the second media receiver, the present media receiver message comprising an indication that the first media receiver has been deactivated.

A second embodiment is a method for transferring receiving of streaming content from a first media receiver to a second media receiver, wherein both the first and second media receivers are associated with the same user, the method comprising the steps, executed in a streaming transfer server, of: receiving a presence message indicating the presence of the second media receiver; receiving an in use message indicating that the first media receiver is in active use by the user; transmitting a present media receiver message to the first media receiver, the present media receiver message comprising an identifier of the second media receiver; receiving a transfer message indicating that the receiving of the streaming content should be transferred from the first media receiver to the second media receiver; obtaining an identifier of the streaming content; and transmitting an initiate content message to the second media receiver, wherein the initiate content message comprises the identifier of the streaming content.

The method may further comprise, after the step of transmitting an initiate content message: reiterating the step of receiving an in use message, wherein the in use message here indicates that the second media receiver is in active use by the user; reiterating the step of transmitting a present media receiver message to the second media receiver, the present media receiver message here comprising an identifier of the first media receiver.

The method may further comprise, prior to the step of transmitting an initiate content message, the step of: obtaining a current position in the streaming content; and wherein in the step of transmitting an initiate content message, the initiate content message comprises the current position in the streaming content.

The transfer message may comprise the current position in the streaming content and the step of obtaining a current position may comprise obtaining the current position from the transfer message.

The step of obtaining a current position may comprise obtaining the current position by querying a content server arranged to stream the streaming content.

The transfer message may comprise the identifier of the streaming content and the step of obtaining an identifier of the streaming content may comprise obtaining the identifier of the streaming content from the transfer message.

The step of obtaining an identifier of the streaming content may comprise obtaining the identifier of the streaming content by querying the first media receiver.

The step of receiving a presence message may comprise receiving a presence message from a device gateway capable of discovering presence of a media receiver connected to the device gateway.

The step of receiving a presence message may further comprise receiving a presence message indicating the presence of a third media receiver; and the step of transmitting a present media receiver message, comprises transmitting a present media receiver message comprising an identifier of the third media receiver.

The method may further comprise the steps of: receiving a deactivate message indicating that the first media receiver has been deactivated; and reiterating the step of transmitting a present media receiver message to the second media receiver, the present media receiver message comprising an indication that the first media receiver has been deactivated.

A third embodiment is a computer program for a streaming transfer server to transfer receiving of streaming content from a first media receiver to a second media receiver, wherein both the first and second media receivers are associated with the same user, the computer program comprising computer program code which, when run on the streaming transfer server, causes the streaming transfer server to: receive a presence message indicating the presence of the second media receiver; receive an in use message indicating that the first media receiver is in active use by the user; transmit a present media receiver message to the first media receiver, the present media receiver message comprising an identifier of the second media receiver; receive a transfer message indicating that the receiving of the streaming content should be transferred from the first media receiver to the second media receiver; obtain an identifier of the streaming content; and transmit an initiate content message to the second media receiver, wherein the initiate content message comprises the identifier of the streaming content.

A fourth embodiment is a computer program product comprising a computer program according to the third embodiment and a computer readable means on which the computer program is stored.

It is to be noted that any feature of the first, second, third and fourth embodiments may, where appropriate, be applied to any other of these embodiments.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
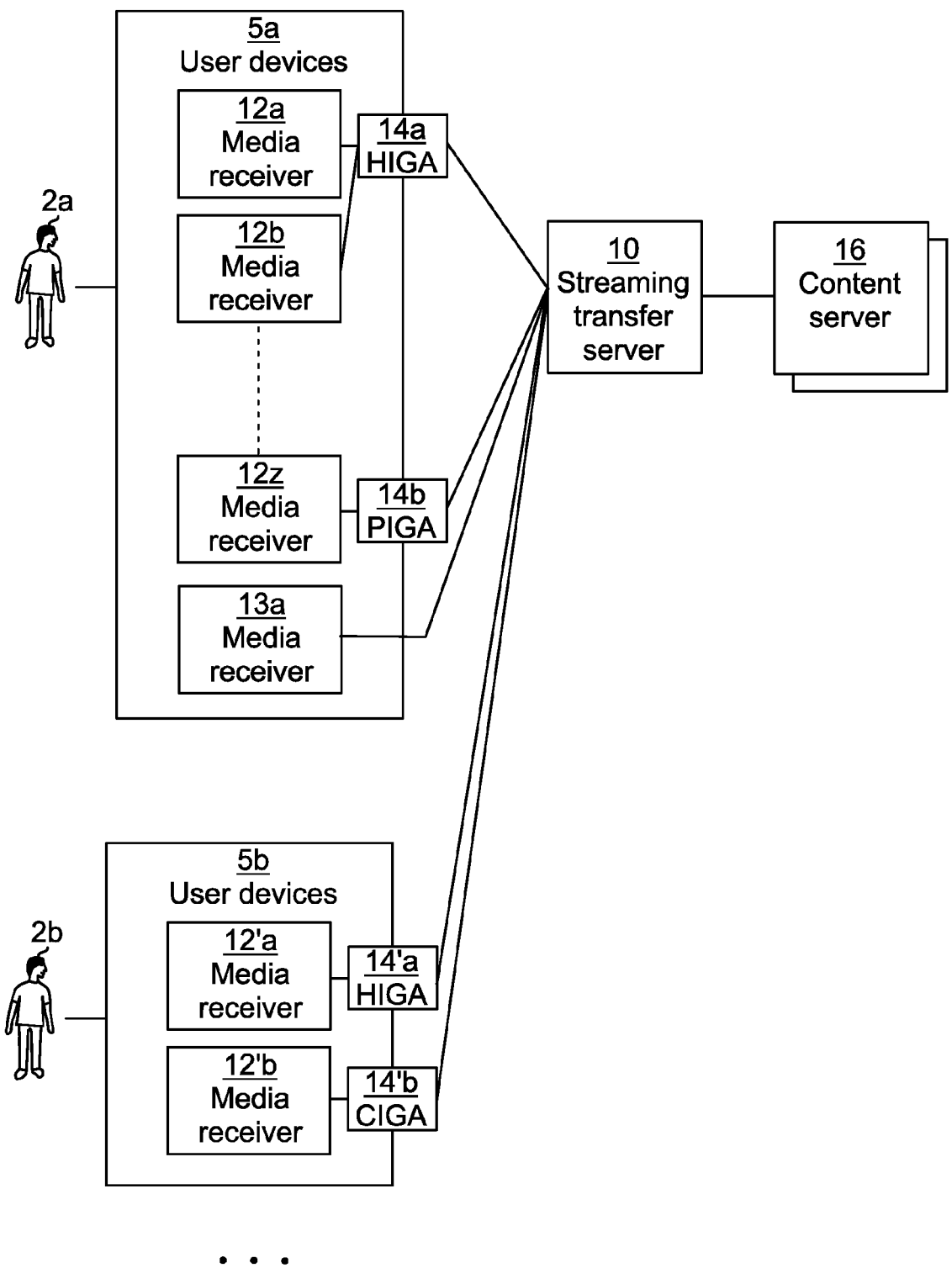
FIG. 1 is a schematic diagram showing an overview of signaling in an environment where embodiments of the invention can be applied.

FIG. 1 is a schematic diagram showing an overview of signaling in an environment where embodiments of the invention can be applied. A content server 16 is set up to be able to stream content. The content server can for example serve streaming media such as video and/or audio to one or more of the media receivers 12a-z. The content server 16 can be one or more physical entities in one or more locations providing a service such as YouTube, e.g. accessible through the world wide web (www). Additionally, there may be more than one content server 16, but for simplicity only one content server 16 is referred to hereinafter. The content server 16 is connected to a streaming transfer server 10 which is used when a user 5a, 5b would like to transfer the receiving of media content from one device to another.

A first user 2a is associated with a set of user devices 5a which is a collection of media receivers 12a-z. This association can for example be a subscription to a content service or a configuration in an IMS (Internet Protocol Multimedia System) system. Optionally, the media receivers 12a-z are all registered to the user 2a in a system such as the IMS system.

The user 2a has two gateways 14a, 14b which are capable of discovering the presence of devices within their domain. For example, 14a can be a HIGA (Home IMS Gateway) arranged to discover when any of the media receivers 12a-b are powered on and available. The HIGA can for example discover this using any suitable device discovery protocol, e.g. using SIP (Session Initiation Protocol), UPnP (Universal Plug and Play), DLNA (Digital Living Network Alliance) which in turn uses UPnP, Bonjour, etc. The user 2a has previously configured the HIGA such that devices 12a and 12b are associated with the account of the user 2a. Also, a PIGA (Portable IMS Gateway) 14b is configured to be able to discover the portable media receiver 12z.

As indicated by the three dots in FIG. 1, the user 2a is not limited to shown gateways 14a, 14b or media receivers 12a-z and can be configured to use more or fewer units. For example, the user could also have configured a CIGA (Car IMS Gateway) for use of a media streaming device in a car (not shown). The gateways 14a-b are connected to the streaming transfer server 10 to allow the streaming transfer server 10 to keep track of what media receivers 12a-z of the user 12a are present, i.e. turned on and available for use.

Furthermore, the user 2a has a media receiver 13a which is connected to the streaming transfer server without going through an intermediary gateway. This media receiver can for example be a general purpose computer such as a personal computer or a tablet computer.

A second user 2b has a separate set of user devices 5b containing media receivers 12'a, 12'b and associated gateways 14'a, 14'c. Analogously, the gateways 14'a, 14'c are connected to the streaming transfer server 10. Although not shown, the system supports more users as necessary.

Figure 2:
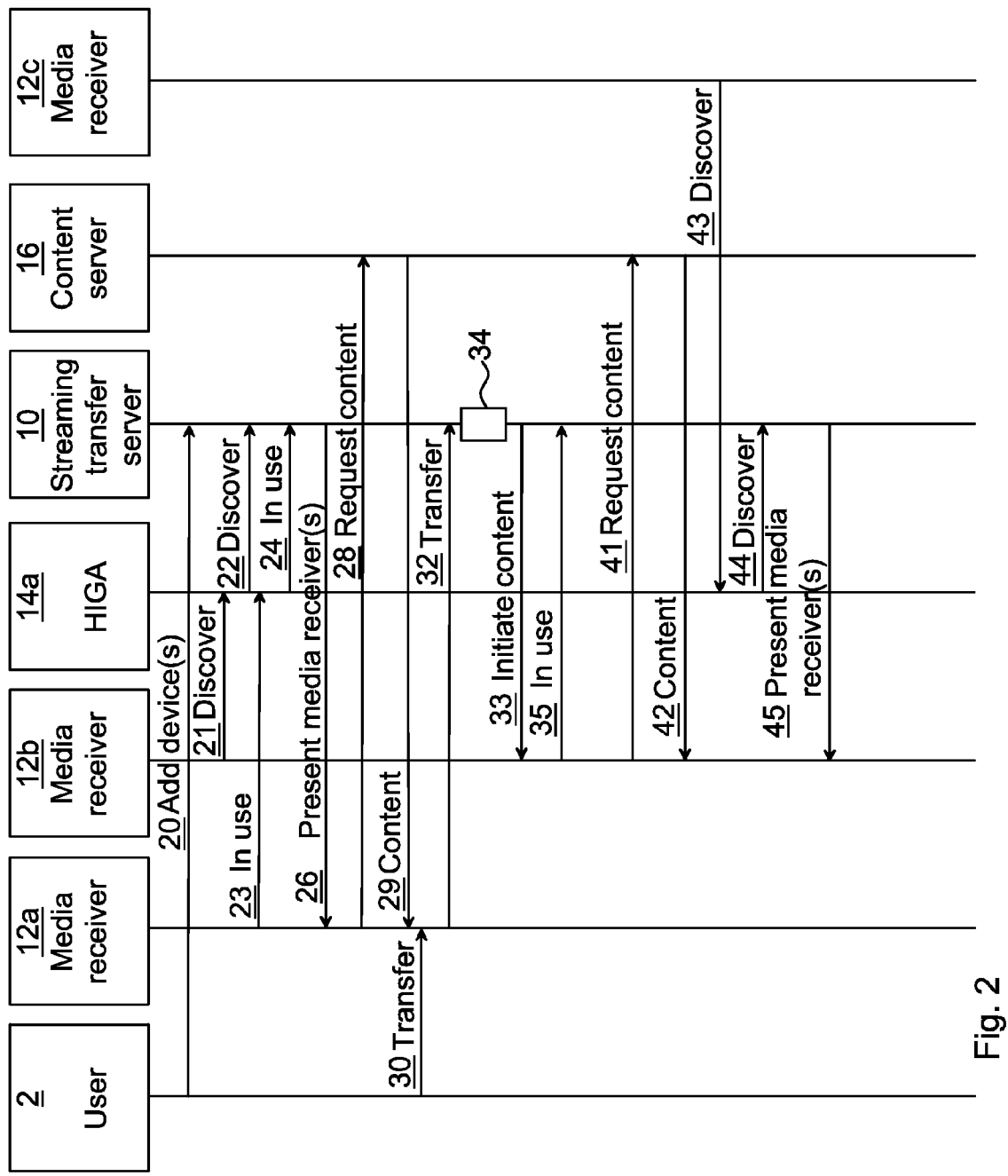
FIG. 2 is a sequence diagrams illustrating communication in embodiments between the components of FIG. 1 to transfer the receiving of content from one media receiver to another.

FIG. 2 is a sequence diagrams illustrating communication in embodiments between the components of FIG. 1 to transfer the receiving of content from one media receiver to another. All communication can e.g. occur using IP (Internet Protocol). In one embodiment, all signaling is performed over HTTP (Hypertext Transport Protocol), and only the content streaming is over a different protocol such as UDP (User Datagram Protocol), or indeed also over HTTP.

Initially, the user 2 adds 20 devices to the streaming server 10. This can be performed e.g. by direct configuration in the streaming server 10, such as by using a web interface, e.g. during an account registration in the streaming transfer server 10. Alternatively or additionally, the user 2 configures the gateways such as HIGA 14a. The configuration associates the user 2 with the media receivers that the user 2 would like to be associated with herself/himself, such as a first media receiver 12a and a second media receiver 12b. This configuration does not need to be repeated until new devices are to be added or existing devices are removed.

Once configured, the second media receiver 12b is turned on, which is discovered 21 by the HIGA 14a. The HIGA 14a sends a presence message 22 to the streaming transfer server 10 to indicate the presence of the second media receiver 12b. Also, the user 2 is using the first media receiver 12a, which sends an in use message 23 to the HIGA 14a. This could also be discovered by the HIGA 14a. The HIGA 14a then sends an in use message 24 to the streaming transfer server 10 to indicate that the first media receiver 12a is in active use by the user 2.

The streaming transfer server 10 then sends a present media receiver(s) message 26 to the media receiver which is currently in use by the user, i.e. first media receiver 12a. The first media receiver 12a is then ready to send a request 28 for content to the content server 16, after which the content server 16 responds with the requested content 29.

In the user interface from the first media receiver 12a to the user 2, the user 2 is presented with a list of potential streaming devices to transfer to. In this example, the list contains the second media receiver 12b, since it is only the second media receiver 12b which has been discovered to be present. Had there been more media receivers present, the list would contain all those present media receivers.

The user 2, in this example, then decides to continue receiving the streaming content from the content server 16 using the second media receiver 12b. To transfer the receiving of streaming content from the first media receiver 12a to the second media receiver 12b, the user commands 30 the media receiver in use, in this case the first media receiver 12a, to effect the transfer.

The first media receiver 12a sends 32 a transfer message to the streaming transfer server 10 indicating that the receiving of the streaming content should be transferred from the first media receiver 12a to the second media receiver 12b. The first media receiver 12a can then stop receiving the streaming content, e.g. by sending a stop command to the content server 16 (not shown).

In a processing stage 34, the streaming transfer server 10 obtains the identifier of the content, either as part of the transfer message or by querying the first media receiver 12a. Optionally, the streaming transfer server 10 also obtains the current position in the streaming content to allow the streaming to start at the same position when the receiving is transferred to the second media receiver 12b.

The streaming transfer server 10 then sends an initiate content message 33 to the second media receiver 12b, where the initiate content message comprises the content identifier. The second media receiver 12b, like all media receivers herein, comprises a listening module so it is ready to receive such a message to initiate content. Once the second media receiver 12b has received this command, it sends an in use message 35 to the streaming transfer server 10. The streaming transfer server updates its tables to note that the second media receiver 12b is now the media receiver in use for the user 2. The second media receiver 12b then sends a request 41 for the same content (as identified by the content identifier in the initiate content message), optionally with an indicator of position, to the content server 12, upon which the content server responds with streaming the content 42 to the second streaming device 12b, optionally at the indicated position (same position as was the case for the first media receiver 12a prior to the transfer).

In the user interface of the second media receiver 12b, the user is presented with an option to transfer the receiving of streaming content back to the first media receiver 12a.

If now a third media receiver 12c is powered on (and previously registered in the message to add devices 20), this is discovered 43 by the HIGA 14a. The HIGA 14a then sends a discover message 44 to the streaming transfer server 10, which sends a new present streaming device(s) message 45, then including references to the first media receiver 12a and the third media receiver 12c. This allows the second media receiver 12b, in its user interface, to present an option to transfer the streaming receiving to either the first media receiver 12a or the third media receiver 12c.

It is to be noted that while the media receivers presented in FIG. 2 are connected to the streaming transfer server 10 via a gateway, any one or more could equally well be media receivers connected to the streaming transfer server without a gateway, such as the media receiver 13a of FIG. 1.

Figure 3:
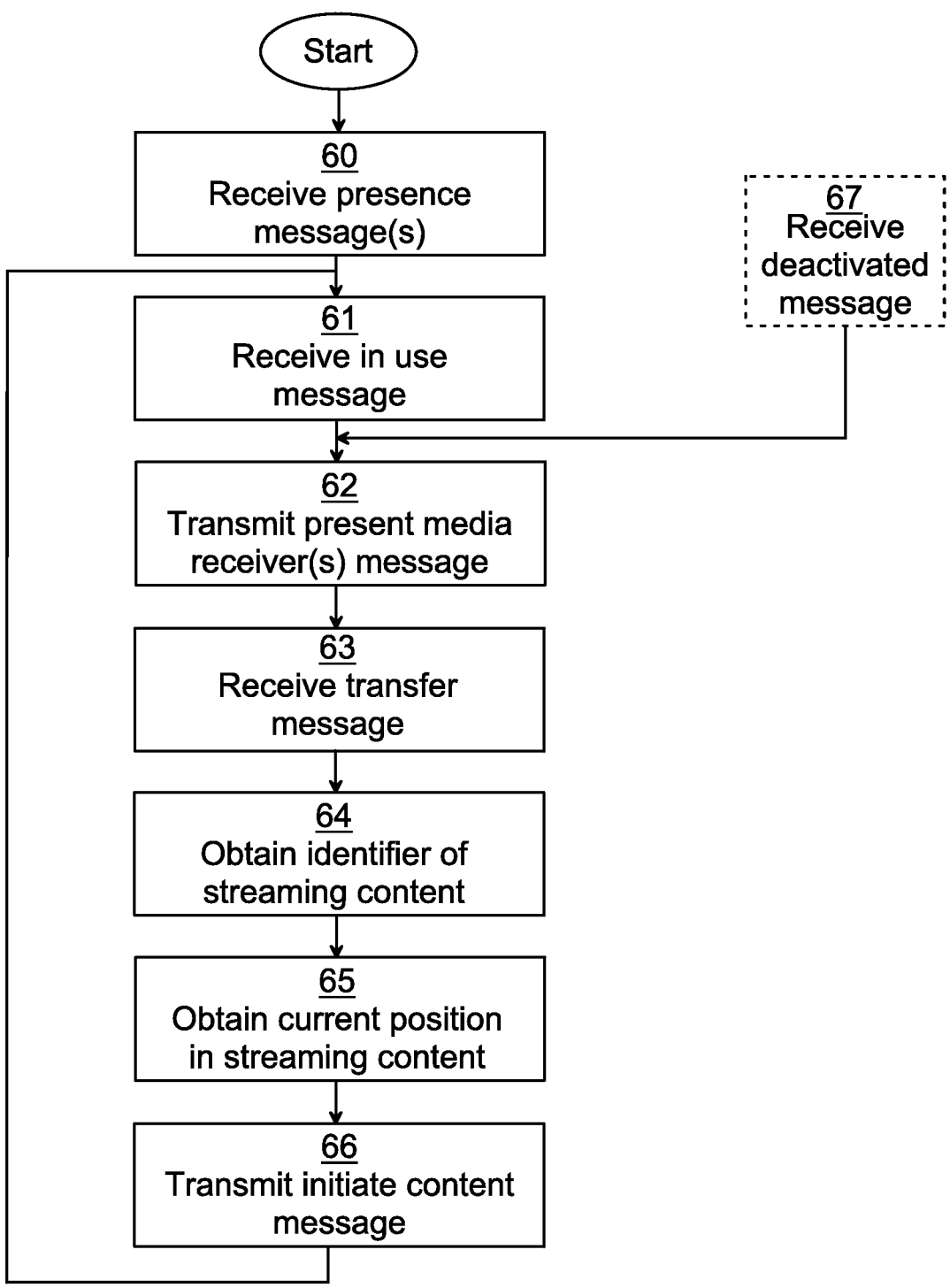
FIG. 3 is a flow chart illustrating an embodiment of a method implemented in the streaming transfer server of FIG. 1.
Figure 5:
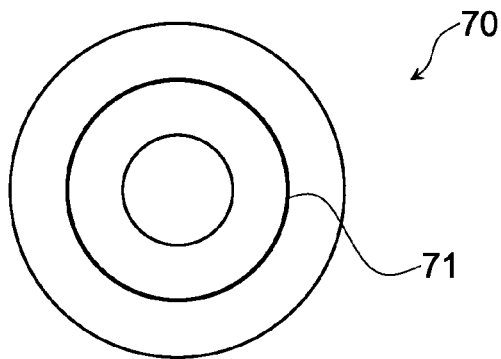
FIG. 5 shows one example of a computer program product comprising computer readable means.

FIG. 3 is a flow chart illustrating an embodiment of a method implemented in the streaming transfer server of FIG. 1. The method corresponds to the communication of the streaming transfer server 10 of FIG. 2. The method can be implemented using a computer program as depicted in FIG. 5. The method is to be construed as what occurs for each user in the system of FIG. 1. In other words, there may be several separate instances of the method running for separate users at any one time. In a scenario used to illustrate the embodiment described below, the method is executed for user A.

Prior to this method, the streaming transfer server 10 has been configured with a list of associations between media receivers and users, as exemplified in Table 1 below. Optionally a gateway field is included:

TABLE 1a media receiver to user association

| User | Media receiver ID | Gateway | Discovery method | Present |
|---|---|---|---|---|
| A | 1 | i | SIP | 0 |
| A | 2 | i | SIP | 0 |
| A | 3 | ii | UPnP | 0 |
| B | 7 | iv | DLNA | 0 |
| B | 9 | | | 0 |
| ... | ... | ... | ... | ... |

Table 1a also includes a field for discovery method, e.g. SIP, UPnP, etc. The field called "present" indicates whether the media receiver in question is present, i.e. powered on and ready to receive a content stream from the content server. The media receiver IDs can for example be IP addresses, SIP URIs (uniform resource identifiers) or UPnP UUIDs (universally unique identifiers).

The last line in the table represents the example where a media receiver is connected to the streaming transfer server 10 without a gateway, such as media receiver 13a of FIG. 1. Optionally, such a media receiver could also have a discovery method associated with it.

In a receive presence message(s) step 60, the streaming transfer server 10 receives one or more presence messages indicating the presence of discovered media receivers. This updates table 1 above, changing the field present from 0 to 1 for any media receivers for which presence messages are received. Optionally, this step includes a query from the streaming transfer server 10, i.e. a poll to update discover media receiver states. In the described scenario two presence messages are received for media receivers with ids 2 and 3.

TABLE 1b media receiver states after presence updates

| User | Media receiver ID | Gateway | Discovery method | Present |
|---|---|---|---|---|
| A | 1 | i | SIP | 0 |
| A | 2 | i | SIP | 1 |
| A | 3 | ii | UPnP | 1 |
| B | 7 | iv | DLNA | 0 |
| B | 9 | | | 0 |
| ... | ... | ... | ... | ... |

In a receive in use message step 61, the in use message is received, the in use message indicating that what media receiver is in active use by a particular user. As an illustrative example, this can be stored by the streaming transfer server 10 in a table such as Table 2a below. In the described scenario, an in use message is received to indicate that the media receiver with ID 1 is the in use media receiver for user A. User B has no media receiver in use in this scenario, indicated by a 0.

TABLE 2a association between user and media receiver being in use

| User | In use media receiver ID |
|---|---|
| A | 1 |
| B | 0 |
| ... | ... |

In a transmit present media receiver message step 62, the present media receiver message step 62 is sent to the media receiver being in use. The present media receiver message comprises an identifier of all other present media receivers for the user. In the described scenario, the present media receiver message is sent to the media receiver with ID 1 for user A, and the message contains the media receiver identifiers of 2 and 3. This allows the media receiver with ID 1 to present to the user in its user interface the ability to transfer receiving of streaming content to any one of the media receivers 2 or 3.

Once the user of the media receiver in use has selected which device to transfer to, the transfer message is received from the media receiver in use in a receiving a transfer message step 63 from the media receiver which is in use. The transfer message indicates that the receiving of the streaming content should be transferred from the media receiver in use to a target present media receiver. In the described scenario, the streaming transfer server 10 receives a transfer message to transfer the receiving of streaming content from the media receiver with ID 1 to media receiver with ID 3.

Then the identifier of the streaming content is obtained in an obtain identifier of streaming content step 64. This can be performed e.g. by retrieving this information from the transfer message (if available there) or by querying the in use media receiver.

Optionally the current position in the streaming content is obtained in an obtain current position in streaming content step 65. This can be performed e.g. by retrieving this information from the transfer message or by querying the in use media receiver or the content server.

Once all relevant information has been obtained, the initiate content message is sent to the target media receiver, as indicated in the transfer message, i.e. in the described scenario the media receiver with ID 3. The initiate content message comprises the identifier of the streaming content and optionally the position in the streaming content.

The table indicating media receiver states is then updated to reflect that the media receiver with ID 3 is now no longer a media receiver for which transfer is possible (since it has just been transferred control to), giving a result as shown in Table 1c below:

TABLE 1c media receiver states after presence updates

| User | Media receiver ID | Gateway | Discovery method | Present |
|---|---|---|---|---|
| A | 1 | i | SIP | 1 |
| A | 2 | i | SIP | 1 |
| A | 3 | ii | UPnP | 0 |
| B | 7 | iv | DLNA | 0 |

TABLE 1c-continued media receiver states after presence updates

| User | Media receiver ID | Gateway | Discovery method | Present |
|---|---|---|---|---|
| B | 9 | | | 0 |
| ... | ... | ... | ... | ... |

The method then returns to the receive in use message step 62, where an in use message is received for the media receiver with ID 3. This will result in an updated table for the in use media receivers as illustrated in Table 2b below:

TABLE 2b association between user and media receiver being in use

| User | In use media receiver ID |
|---|---|
| A | 3 |
| B | 0 |
| ... | ... |

In a separate thread, messages are received about updated presence states. For example, in a receive deactivate message step 67, a deactivate message is received which removes a previously present media receiver from the media receiver states table. In our scenario, a deactivate message is received for the media receiver with ID 1, after which the media receiver states table would look like what is shown in Table 1d below:

TABLE 1d media receiver states after presence updates

| User | Media receiver ID | Gateway | Discovery method | Present |
|---|---|---|---|---|
| A | 1 | i | SIP | 0 |
| A | 2 | i | SIP | 1 |
| A | 3 | ii | UPnP | 0 |
| B | 7 | iv | DLNA | 0 |
| B | 9 | | | 0 |
| ... | ... | ... | ... | ... |

After such an update, the method continues to the transmit present media receiver(s) message step 62, to ensure that the media receiver being in use has an updated list of present devices. In fact, the transmit present media receiver(s) message step 62 may send a present media receiver(s) message comprising no references to present media receivers if none are present.

Figure 4A:
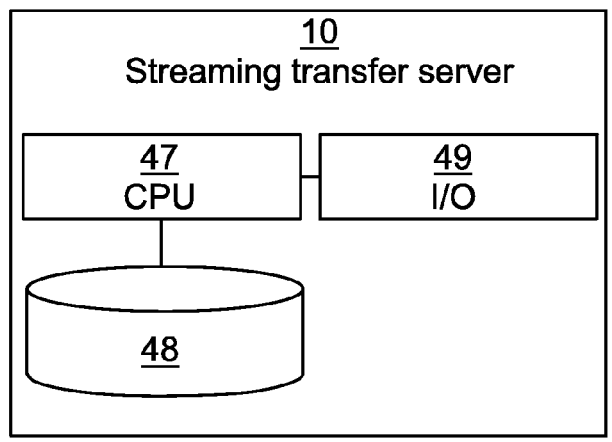
FIG. 4a is a schematic diagram of components of the streaming transfer server of FIG. 1.

FIG. 4a is a schematic diagram of components of the streaming transfer server 10 of FIG. 1. A controller 47 is provided using any suitable central processing unit (CPU), microcontroller, digital signal processor (DSP), etc., capable of executing software instructions stored in a computer readable media 48, e.g., memory. The computer readable media 48 can be any combination of read and write memory (RAM) and read only memory (ROM). The computer readable media 48 also comprises persistent storage, which, for example, can be any single one or combination of magnetic memory, optical memory, or solid state memory.

An input/output interface 49 is provided to allow the streaming transfer server 10 to communicate with other entities such as the media receivers 12a-z and content server 16.

A local operator interface is optionally provided to allow an operator to interact with the streaming transfer server 10. The operator interface can include a display and an input device such as a keyboard, a touch function of the display and/or a positional input device such as a mouse, trackball, etc.

The streaming transfer server 10 can be integrated in one unit, or it can be separated into several separate units, e.g. for reasons of upgradeability, media receiver proximity, ease of implementation or redundancy.

Figure 4B:
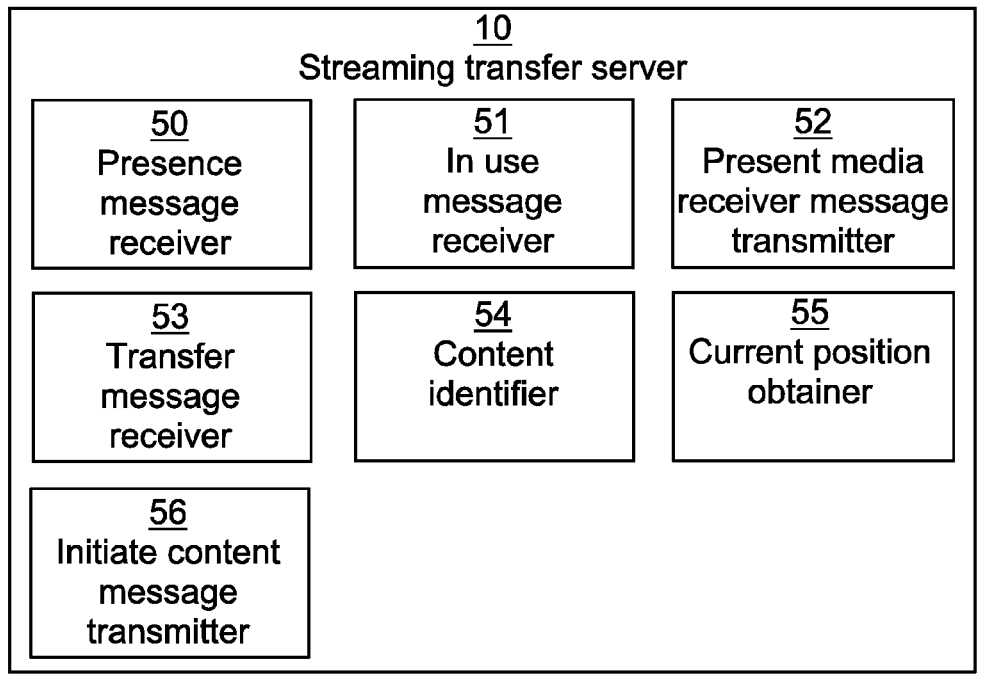
FIG. 4b is a schematic diagram showing functional modules of the streaming transfer server of FIG. 1.

FIG. 4b is a schematic diagram showing functional modules of the streaming transfer server 10 of FIG. 1. The modules can be implemented using software such as a computer program executing in the streaming transfer server 10.

All modules depend on an execution environment which can utilise the controller 47, computer program product 48 and/or I/O interface 49 of FIG. 4a. The modules implement communication of the streaming transfer server 10 of FIG. 2 and correspond to the method steps of FIG. 3.

A presence message receiver 50 is arranged to receive the presence message indicating the presence of any media receiver 12b, wherein the presence message comprises an identifier of the user and the media receiver which is present.

An in use message receiver 51 is arranged to receive the in use message indicating which media receiver is in active use by a particular user. The in use message thus comprises an identifier of the user and the media receiver being in use.

A present media receiver message transmitter 52 is arranged to transmit the present media receiver message to the media receiver being in use.

A transfer message receiver 53 is arranged to receive the transfer message indicating that the receiving of the streaming content should be transferred from the media receiver being in use to a target media receiver.

A content identifier 54 is arranged to obtain the identifier of the streaming content.

An initiate content message transmitter 56 is arranged to transmit the initiate content message to the target media receiver.

An optional current position obtainer 55 can be arranged to obtain the current position in the streaming content prior to the transfer. In such cases, the initiate content message comprises the current position in the streaming content.

FIG. 5 shows one example of a computer program product 70 comprising computer readable means. On this computer readable means a computer program 71 can be stored, which computer program 71 can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 48 of the streaming transfer server 10. While the computer program 71 is here schematically shown as a track on the depicted optical disk, the computer program can be stored in any way which is suitable for the computer program product, such as a USB (Universal Serial Bus) flash drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A streaming transfer server for transferring receiving of streaming content from a first media receiver to a second media receiver, wherein both the first and second media receivers are associated with the same user, the streaming transfer server comprising:

at least one processor;

at least one memory coupled to the at least one processor and comprising computer readable program code that when executed by the at least one processor causes the at least one processor to perform operations comprising:
    receiving a presence message indicating the presence of the second media receiver;
    receiving an in use message indicating that the first media receiver is in active use by the user;
    transmitting a present media receiver message to the first media receiver, the present media receiver message comprising an identifier of the second media receiver;
    receiving a transfer message indicating that the receiving of the streaming content should be transferred from the first media receiver to the second media receiver,
    obtaining an identifier of the streaming content; and
    transmitting an initiate content message to the second media receiver, wherein the initiate content message comprises the identifier of the streaming content.

2. The streaming transfer server according to claim 1, wherein the at least one processor performs operations further comprising:
    receiving an in use message indicating that the second media receiver is in active use by the user; and
    transmitting a present media receiver message to the second media receiver, the present media receiver message comprising an identifier of the first media receiver.

3. The streaming transfer server according to claim 1, wherein the at least one processor performs operations further comprising:
    obtaining a current position in the streaming content; and
    wherein the initiate content message comprises the current position in the streaming content.

4. The streaming transfer server according to claim 1, wherein the transfer message comprises the current position in the streaming content, and
    the at least one processor performs operations further comprising obtaining the current position from the transfer message.

5. The streaming transfer server according to claim 1, wherein the at least one processor performs operations further comprising obtaining the current position by querying a content server serving the streaming content.

6. The streaming transfer server according to claim 1, wherein the transfer message comprises the identifier of the streaming content, and
    the at least one processor performs operations further comprising obtaining the identifier of the streaming content from the transfer message.

7. The streaming transfer server according to claim 1, wherein the at least one processor performs operations further comprising obtaining the identifier of the streaming content by querying the first media receiver.

8. The streaming transfer server according to claim 1, wherein the at least one processor performs operations further comprising receiving a presence message from a device gateway capable of discovering presence of a media receiver connected to the device gateway.

9. The streaming transfer server according to claim 1, wherein the at least one processor performs operations further comprising:
    receiving a presence message indicating the presence of a third media receiver; and
    transmitting a present media receiver message comprising an identifier of the third media receiver.

10. The streaming transfer server according to claim 1, wherein the at least one processor performs operations further comprising:
    receiving a deactivate message indicating that the first media receiver has been deactivated; and
    transmitting a present media receiver message to the second media receiver, the present media receiver message comprising an indication that the first media receiver has been deactivated.

11. The streaming transfer server according to claim 1,
    wherein the presence message indicating the presence of the second media server is received from a Home IMS Gateway (HIGA) that has discovered the second media receiver, and
    wherein the in use message indicating that the first media receiver is in active use by the user is received from the HIGA.

12. The streaming transfer server according to claim 1, wherein the presence message comprises a first presence message, and wherein the present media receiver message comprises a first present media receiver message, the streaming transfer server further comprising:
    the presence message receiver being further arranged to receive a second presence message from a Home IMS Gateway (HIGA) indicating the presence of a third media receiver,
    the present media receiver message transmitter being further arranged to transmit a second present media receiver message comprising an identifier of the first media receiver and an identifier of the third media receiver, and
    wherein the second present media receiver message triggers the second media receiver to present a first option to transfer the streaming content to the first media receiver and a second option to transfer the streaming content to the third media receiver.

13. A method for transferring receiving of streaming content from a first media receiver to a second media receiver, wherein both the first and second media receivers are associated with the same user, the method, executed in a streaming transfer server, and comprising:
    receiving a presence message indicating the presence of the second media receiver;
    receiving an in use message indicating that the first media receiver is in active use by the user;
    transmitting a present media receiver message to the first media receiver, the present media receiver message comprising an identifier of the second media receiver;
    receiving a transfer message indicating that the receiving of the streaming content should be transferred from the first media receiver to the second media receiver;
    obtaining an identifier of the streaming content; and
    transmitting an initiate content message to the second media receiver, wherein the initiate content message comprises the identifier of the streaming content.

14. The method according to claim 13, further comprising, after the transmitting an initiate content message:
    reiterating the receiving the in use message, wherein the in use message here indicates that the second media receiver is in active use by the user;
    reiterating the transmitting the present media receiver message to the second media receiver, the present media receiver message here comprising an identifier of the first media receiver.

15. The method according to claim 13, prior to the transmitting the initiate content message, further comprising:
    obtaining a current position in the streaming content; and
    wherein in the transmitting the initiate content message, the initiate content message comprises the current position in the streaming content.

16. The method according to claim 15, wherein the transfer message comprises the current position in the streaming content and the obtaining the current position comprises obtaining the current position from the transfer message.

17. The method according to claim 15, wherein the obtaining the current position comprises obtaining the current position by querying a content server arranged to stream the streaming content.

18. The method according to claim 13, wherein the transfer message comprises the identifier of the streaming content and the obtaining the identifier of the streaming content comprises obtaining the identifier of the streaming content from the transfer message.

19. The method according to claim 13, wherein the obtaining the identifier of the streaming content comprises obtaining the identifier of the streaming content by querying the first media receiver.

20. The method according to claim 13, wherein the receiving the presence message comprises receiving a presence message from a device gateway capable of discovering presence of a media receiver connected to the device gateway.

21. The method according to claim 13, wherein the receiving a presence message further comprises receiving a presence message indicating the presence of a third media receiver;
and wherein the transmitting the present media receiver message comprises transmitting a present media receiver message comprising an identifier of the third media receiver.

22. The method according to claim 13, further comprising:
receiving a deactivate message indicating that the first media receiver has been deactivated; and
reiterating the transmitting the present media receiver message to the second media receiver, the present media receiver message comprising an indication that the first media receiver has been deactivated.

23. The method according to claim 13,
wherein the presence message indicating the presence of the second media server is received from a Home IMS Gateway (HIGA) that has discovered the second media receiver, and
wherein the in use message indicating that the first media receiver is in active use by the user is received from the HIGA.

24. The method according to claim 13, wherein the presence message comprises a first presence message, and wherein the present media receiver message comprises a first present media receiver message, the method further comprising:
receiving a second presence message from a Home IMS Gateway (HIGA) indicating the presence of a third media receiver,
transmitting a second present media receiver message comprising an identifier of the first media receiver and an identifier of the third media receiver, and
triggering the second media receiver to present a first option to transfer the streaming content to the first media receiver and a second option to transfer the streaming content to the third media receiver.

25. A computer program product on a tangible non-transitory computer readable storage medium for a streaming transfer server and configured to transfer receiving of streaming content from a first media receiver to a second media receiver, wherein both the first and second media receivers are associated with the same user, the computer program product comprising computer program code which, when run on the streaming transfer server, causes the streaming transfer server to:
receive a presence message indicating the presence of the second media receiver;
receive an in use message indicating that the first media receiver is in active use by the user;
transmit a present media receiver message to the first media receiver, the present media receiver message comprising an identifier of the second media receiver;
receive a transfer message indicating that the receiving of the streaming content should be transferred from the first media receiver to the second media receiver;
obtain an identifier of the streaming content; and
transmit an initiate content message to the second media receiver, wherein the initiate content message comprises the identifier of the streaming content.

* * * * *